United States Patent
Patel et al.

(10) Patent No.: US 6,207,205 B1
(45) Date of Patent: Mar. 27, 2001

(54) SPICY POPCORN WITH NATURAL INGREDIENTS

(76) Inventors: Kiritkumar J. Patel, 2724, Monterey Rd., San Jose, CA (US) 95111; Shilpa P. Patel, 38, Tatsat Flat, Bhudur pura Road, Amgavadi. Ahmedagad, 3800015; Bharatkumar Jethalal Patel, 3/13 Old Prabhunagar Society, Asarva, Ahmedabad 380016, both of (IN)

( * ) Notice: Subject to any disclaimer, the term of this patent is extended or adjusted under 35 U.S.C. 154(b) by 0 days.

(21) Appl. No.: 09/274,075

(22) Filed: Mar. 22, 1999

(51) Int. Cl.$^7$ .................................................. A23L 1/18
(52) U.S. Cl. ........................... 426/93; 426/629; 426/638
(58) Field of Search ............................... 426/93, 629, 638, 426/309, 445, 395

(56) References Cited

U.S. PATENT DOCUMENTS

| | | | | |
|---|---|---|---|---|
| 4,640,842 | * | 2/1987 | May | 426/534 |
| 4,999,205 | * | 3/1991 | Todd, Jr. | 426/250 |
| 5,688,543 | * | 11/1997 | Freeport et al. | 426/93 |
| 5,750,166 | * | 5/1998 | Schellhaass | 426/93 |
| 5,753,287 | * | 5/1998 | Chedid et al. | 426/93 |
| 5,804,244 | | 8/1998 | Howell et al. . | |
| 5,897,894 | * | 4/1999 | Glass | 426/89 |

* cited by examiner

*Primary Examiner*—Nina Bhat

(57) ABSTRACT

A method to prepare spicy popcorn with natural ingredients for providing a snack food. The ingredients are turmeric powder, red chili powder, black peppers, sea salt, garlic powder, penut or corn oil and chili powder.

3 Claims, No Drawings

SPICY POPCORN WITH NATURAL INGREDIENTS

It is an object of the present invention to provide a new hot spicy corn, which may be easily and efficiently manufactured and marketed.

It is a further object of the present invention to provide new spicy popcorn, which is of a durable and reliable construction.

An even further object of the present invention is to provide a new hot spicy corn which is susceptible of a low cost of manufacture with regards to both material and labor, and which accordingly is then susceptible of low prices of sell to the consuming public, there by marking such spicy popcorn economically available to the buying public.

Still yet another object of the present invention is to provide a new hot spicy corn which provide apparatuses and methods of the prior art some of the advantage thereof, while simultaneously overcoming some of the disadvantages normally associated therewith.

Still another object of the present invention is to provide a new hot spicy corn for providing spicy and zesty flavor popcorn for consumption that can be prepared on the stove or in a microwave.

Yet another object of the present invention is to provide a new hot spicy corn which includes red chili powder, black peppers, turmeric powder, salt, and garlic cooked with oil for zesty flavor.

Still yet another object of the present invention is to provide new spicy popcorn that is a durable and stable mixture.

Even still another of the present invention is to provide new spicy popcorn to the popcorn line that is susceptible of a low cost of producing. This together with other objects of the invention along with the various feature of the novelty which characterized the invention are pointed out with particularly with the claims and annexed to and forming a part of the disclosure.

DETAILED DESCRIPTION OF THE INVENTION

The present invention spicy popcorn and process for making same is comprised of a mixture of specific natural ingredients in their broadest context include red chili powder, black peppers, salt, turmeric, and garlic with oil such ingredients process properties different from or in addition to those processed by the several ingredients in common and corporate with respect to each other so as to attend the desire objective.

Specifically, the present invention SPICY POPCORN comprises popcorn kernels, red papers, salt, garlic, chili powder, turmeric and oil. The corn kernels are chosen for their ability to become popcorn when heated. The popcorn is made spicy by adding flavoring.

The coating of pureed red chili powder and black peppers in the amount of about forty percent by weight; garlic powder in an amount of one to four percent by weight, oil in an amount of seven to ten percent by weight, and turmeric powder in an amount of ten to fifteen percent by weight. The coating may be cooked on to the corn. The coating when in a powdered form can be packaged for coating the corn during the cooking process in a microwave. The spicy corn can be formulated with or without salt and ingredients. If salt is included it is added in and among of about 1–5 percent by weight.

Oil is poured in to a container with an amount of garlic and turmeric powder and salt and pureed red chili powder and black peppers to form a coating mixture. The coating is then heated to create a uniform sauce like mixture. Further more an amount of oil is added to the mixture for the purpose of cooking the corn kernel. Helping the sauce to stick to the popped corn. Finally the corn kernels are added in to the container with the coating mixture & oil and heating the corn kernel until they popped.

As to a further discussion of the manner of usage and operation of the result invention, to include variation in size, material shape, form function and manner of operation and assembling Further, Since numerous modification and changes will readily occur to those skilled in the art, it is not desire to limit the invention to the exact construction and operation shown and described and accordingly, all suitable modification and equivalents may be restored to falling within the scope of the invention.

We claim:

1. Spicy, unpopped corn kernel composition consisting essentially of:

unpopped corn kernels, pureed red chili powder and black peppers in an amount of about 35 percent by weight; garlic powder in an amount of 1–2 percent by weight; oil in an amount of 1–2.5 percent by weight, and turmeric powder in an amount of 11–17 percent by weight.

2. The spicy unpopped corn kernel composition as set forth in claim 1 further including salt in an amount of about 1–5 percent by weight.

3. A method producing hot and spicy popped corn is by preparing a coating mixture with unpopped corn kernels, said method comparing the step of:

oil is poured into a container and admixed with predetermined amounts of garlic, turmeric powder, salt and pureed red chili powder and black pepper to form a coating mixture, the coating mixture is then heated to a sauce consistency; an additional of oil is added to the coating mixture as well as a predetermined amount of unpopped popcorn is added to the container and further step of heating the unpopped popcorn to provide hot and spicy popped popcorn.

* * * * *